United States Patent [19]
Brauer

[11] Patent Number: 6,000,659
[45] Date of Patent: *Dec. 14, 1999

[54] FULLY RECLINABLE, PIVOTABLE AIRPLANE PASSENGER SLEEPER SEAT ASSEMBLIES

[75] Inventor: R. Klaus Brauer, Seattle, Wash.

[73] Assignee: The Boeing Company, Seattle, Wash.

[*] Notice: This patent issued on a continued prosecution application filed under 37 CFR 1.53(d), and is subject to the twenty year patent term provisions of 35 U.S.C. 154(a)(2).

[21] Appl. No.: 08/773,507

[22] Filed: Dec. 23, 1996

[51] Int. Cl.$^6$ .................................................. B64D 11/06
[52] U.S. Cl. .................................. 244/118.6; 244/118.5; 244/122 R
[58] Field of Search .............................. 244/118.5, 118.6, 244/122 R; 297/240, 344.23, 344.24, 354.13

[56] References Cited

U.S. PATENT DOCUMENTS

| | | | |
|---|---|---|---|
| 3,394,964 | 7/1968 | Humphries et al. | 297/240 |
| 4,671,572 | 6/1987 | Young et al. | 297/344.24 |
| 4,674,713 | 6/1987 | Ryan et al. | 244/122 R |
| 4,729,601 | 3/1988 | Walle et al. | 297/344.24 |
| 4,834,452 | 5/1989 | Goodrich . | |
| 4,925,227 | 5/1990 | Bateman . | |
| 4,969,685 | 11/1990 | Chihaya et al. | 297/344.24 X |
| 5,161,765 | 11/1992 | Wilson | 297/344.24 X |
| 5,333,818 | 8/1994 | Brandt et al. | 244/118.6 |
| 5,568,960 | 10/1996 | Oleson et al. . | |
| 5,740,989 | 4/1998 | Daines | 244/118.6 |

FOREIGN PATENT DOCUMENTS

| | | |
|---|---|---|
| 0 747 256 A1 | 6/1996 | European Pat. Off. . |
| 350 043 | 7/1904 | France . |
| 5-69767 | 3/1993 | Japan ............................ 297/344.23 |
| 2295962 | 12/1995 | United Kingdom . |

OTHER PUBLICATIONS

Booklet entitled "What the 777 Can Do For You". Boeing Commerical Airplane Group, Printed Sep. 1997.

Booklet entitled "The Value Leader: Delivering Value is the Key". Boeing Commercial Airplane Group, Printed Aug. 1997.

Handley Page Hermes, Passenger & Freight Versions of the New British Civil Air Transport: Pay Load up to 16,000 lb., Range up to 2,000 Miles; dated Oct. 19, 1944.

Primary Examiner—Charles T. Jordan
Assistant Examiner—Theresa M. Wesson
Attorney, Agent, or Firm—Carlos M. Herrera

[57] ABSTRACT

A fully reclinable pivotable airplane premium passenger seat. The seat can be translated and/or pivoted from a daytime position to a nighttime position. In the nighttime position, the seat can be fully extended into unused aisle space. In its fully extended position, the seat back may be placed in a horizontal mode and the leg rest fully extended to permit more restful sleep for passengers in a horizontal position.

21 Claims, 12 Drawing Sheets

FULLY RECLINABLE, PIVOTABLE AIRPLANE PASSENGER SLEEPER SEAT ASSEMBLIES

FIELD OF THE INVENTION

This invention relates to airplane passenger seats. More particularly, the present invention relates to reclinable passenger seats allowing passengers to sleep in a more normal horizontal position. Still more particularly, the instant invention pertains to fully reclinable airplane passenger seats capable of using aisle space while the airplane is in flight.

BACKGROUND OF THE INVENTION

As commercial airplanes gain greater range capability and airlines schedule more long duration non-stop flights, there is an increasing demand for premium-class seating that allows passengers to sleep fully reclined, i.e., in a more normal, relaxing, horizontal position. Providing conventional forward-facing seating that reclines to a fully reclined position has certain obvious disadvantages. For example, the seats must be installed at a pitch, i.e., distance between corresponding points on the seats, exceeding the length of the tallest passenger likely encountered plus enough space for window seat passengers to gain access to the aisle when the seat closest to the aisle, i.e., the aisle seat, is fully reclined. Seat pitches on the order of 80 inches are becoming common for this use. Such seat pitches dramatically reduce seating capacity or seat count of the airplane and therefore reduce the revenue that may be generated by the airplane.

The problem of such inefficient space utilization is exacerbated by the fact that passengers are only interested in sleeping on some flight phases or segments and not during all portions of these segments. As an example, eastbound transatlantic flights are typically flown at night and most passengers are interested in sleeping once the meal service is completed. Westbound transatlantic flights by contrast are typically flown during daylight hours with little demand for sleeping facilities. No workable concept has been seen to configure airplanes differently for such westbound and eastbound flights.

Several concepts have been described or are in use to minimize the seat count loss resulting from fully reclinable seating. For example, some airlines have arranged seats in a herringbone or echelon fashion in the forward zone of the Boeing Model 747 (ref. British Patent GB 2,295,962 awarded to Dryburgh, et al.) This arrangement has resulted in a modest reduction of the seat count loss resulting from the installation of fully reclinable seats.

Another example is the provision of alternate sleeping facilities in portions of the airplane not typically used for passenger seating, e.g., in the lower (cargo) hold or above the passenger cabin ceiling. However, these provisions have not proven popular for several reasons. Lower hold installations may displace revenue-generating cargo and thus, have not, generally speaking, proven attractive. In most commercial airplanes there is no usable space above the passenger ceiling. In those airplanes in which space is available, it is of limited size—particularly height. Access to over-ceiling, as well as lower-hold, areas is also difficult. Finally it is believed that passengers do not like to be physically separated from their assigned seat, and the belongings stowed there, while sleeping.

Wide aisles, considerably wider than those required for emergency evacuation, are typically provided in intercontinental first and business-class ("high-yield") passenger cabins. The wider aisles provide ease of boarding and passenger mobility within the cabin while the meal service is in progress. More particularly, the Federal Aviation Administration requires a minimum of 15 inch aisles for passenger emergency evacuation. In contrast, typical first-class aisles in the Boeing Model 747 are 34 inches wide. In both the Boeing Model 777 first-class and in the Boeing Model 747 upper-deck business-class, aisles are 29 inches wide. From the time the dinner service is concluded until breakfast is served, the time when sleeping facilities are most needed ("nighttime"), such wide aisles are unnecessary. This space utilization cycle thus provides a business opportunity for airline owners and operators to increase the revenue generating capacity, and thus value, of their commercial airplanes. The passenger seat assemblies of the present invention completely satisfy this need of airline owners and operators.

In addition, the unique upper deck of the Boeing Model 747 has sloping sidewalls which render the space adjacent to the sidewalls of the interior of the airplane unusable for upright seating. The passenger seat assemblies of the present invention utilize under sidewall space in addition to aisle space to provide sleeping accommodations.

SUMMARY OF THE INVENTION

An object of the present invention is the provision of a method and an apparatus for enhancing the revenue generating capability of a vehicle, such as a commercial airplane.

Another object of this invention is to provide a airplane passenger seat assembly that may be used by airplane passengers during all phases of an airplane flight.

Still another object of the instant invention is to provide a fully reclinable seat assembly permitting relaxful sleep by an airline passenger during the nighttime phase of an airplane flight.

Yet another object of the present invention is the provision of a seating assembly that takes advantage of excess nighttime aisle width and other space available within certain airplanes to provide sleeping accommodations when they are most desired by airline passengers.

An additional object of the present invention is the provision of a simplified seating assembly that takes advantage of excess nighttime aisle width and other space available within certain airplanes to provide sleeping accommodations when they are most desired by airline passengers.

Another additional object of the present invention is the provision of a process for deploying an airplane passenger seat from a daytime position to a nighttime position.

The present invention achieves these and other objects through the provision of an airplane passenger seat assembly capable of rotating about an axis whereby the seat assembly may pivot from a daytime position facing forward in the airplane to a nighttime position. In the nighttime position, the seat back of the seat assembly can, e.g., be fully reclined and the leg rest fully extended into unused aisle space.

BRIEF DESCRIPTION OF THE DRAWINGS

The foregoing and other features and advantages of the present invention will become more readily appreciated by reference to the following detailed description of an embodiment of the invention and the accompanying drawings wherein like numbers refer to the same or similar parts and wherein.

DETAILED DESCRIPTION OF THE PREFERRED EMBODIMENT

Figure 1:
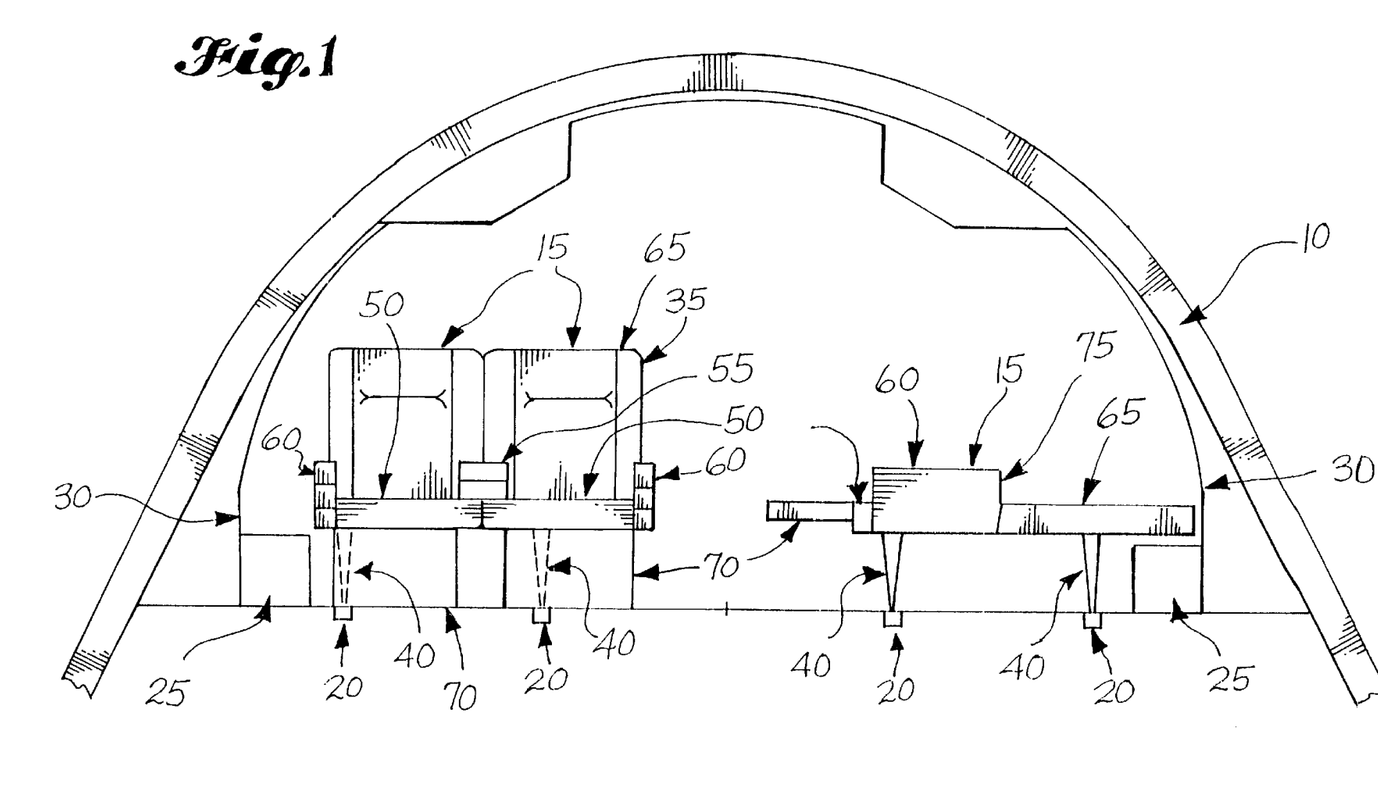
FIG. 1 is a front view of the upper deck of a Boeing Model 747 and illustrates passenger seats disposed in both a daytime and a nighttime position.

Referring now to FIG. 1, there is shown the front view of the upper deck 10 of a Boeing Model 747. This section of the Model 747 airplane is most frequently used by airlines for first-class or business-class passenger service. Disposed throughout the upper deck are a plurality of passenger seats 15 of the present invention conventionally mounted to seat tracks 20 and proximate floor-mounted stowage bins 25 positioned near the upper deck side walls 30. The left hand side of FIG. 1 shows a pivotable, fully reclinable passenger seat of the present invention facing forward and oriented in a position used during boarding, normal flight (including meal service), and deplaning, i.e., the so-called "daytime" position 35. The passenger seat is illustrated for convenience in FIG. 1 as a two-seat unit or "double" although the present invention is not necessarily limited to doubles. These double seats comprise support legs 40 attached to the seat tracks 20, two seat bottom cushions 50, a center arm rest 55, two outer arm rests 60, a pair of back rests 65 and a pair of leg rests 70.

The right hand side of FIG. 1 discloses a side view of the double in a fully reclined or a "nighttime" position 75. The nighttime position allows passengers to enjoy restful sleep in a more normal horizontal plane. As will be better understood hereinafter, the seating units of the present invention may be translated away from the side wall toward the center aisle and pivoted to the nighttime position shown in the right hand side of FIG. 1.

Figure 2:
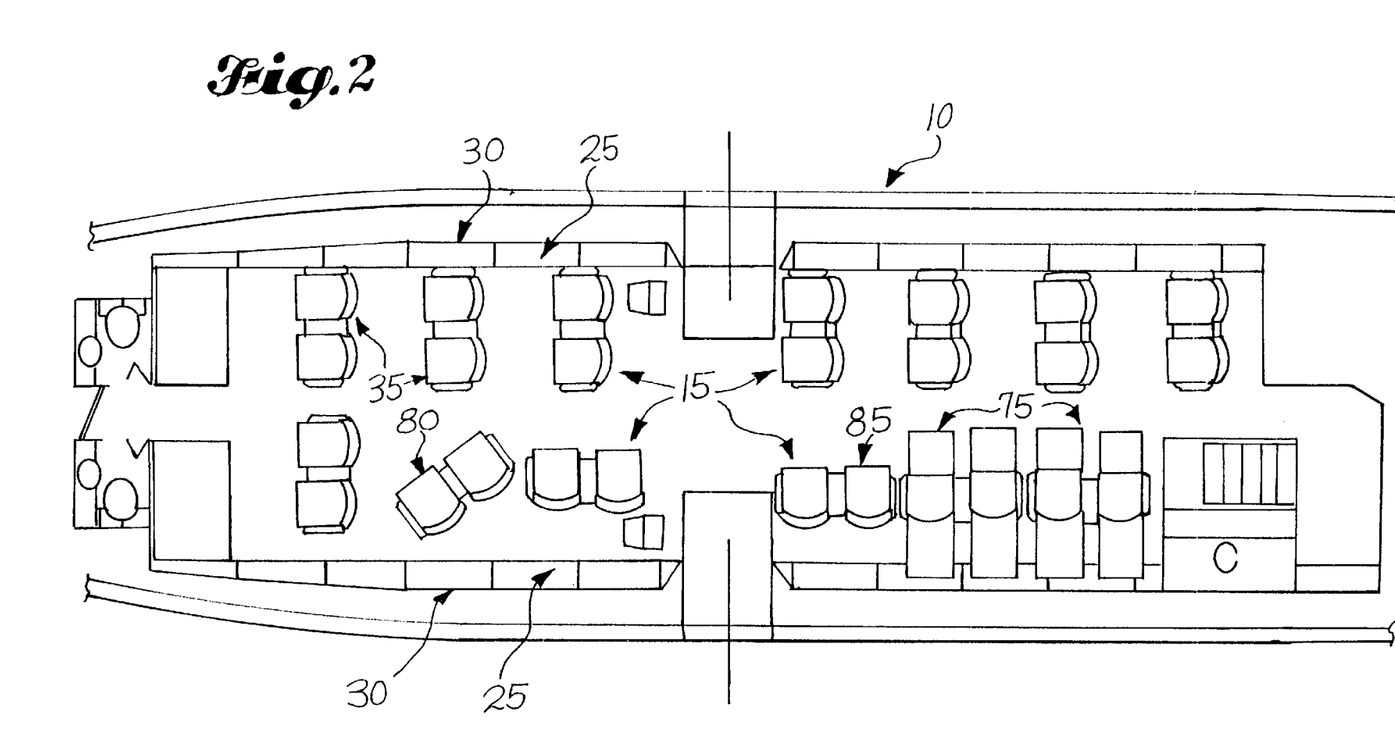
FIG. 2 is a plan view of the upper deck of FIG. 1 and depicts premium passenger seats in daytime, intermediate and nighttime positions.

More particularly, as shown in upper part of the plan view of FIG. 2, the premium seats are shown facing forward in a daytime position 35, i.e., facing forward for boarding, meal service, and deplaning. After meal service is completed after which passengers usually wish to retire for the nighttime phase of the flight, the seats are pivoted from the daytime position, shown at 35, to an intermediate position, shown at 80, and then rotated to a final position shown at 85. The lower right hand side of FIG. 2 shows the seat backs and leg rests of the sleeper passenger seats of the present invention fully reclined and extended, respectively 75.

The fully reclinable pivoting airplane passenger seat of the present invention is shown more particularly in FIGS. 3–15. In particular, the passenger seat assembly comprises an underseat subassembly 90, a sliding carrousel subassembly 95, an upper seat base subassembly 100 and a conventional upper seat subassembly 105 (not shown in FIGS. 4–15 for clarity and convenience).

Figure 4:
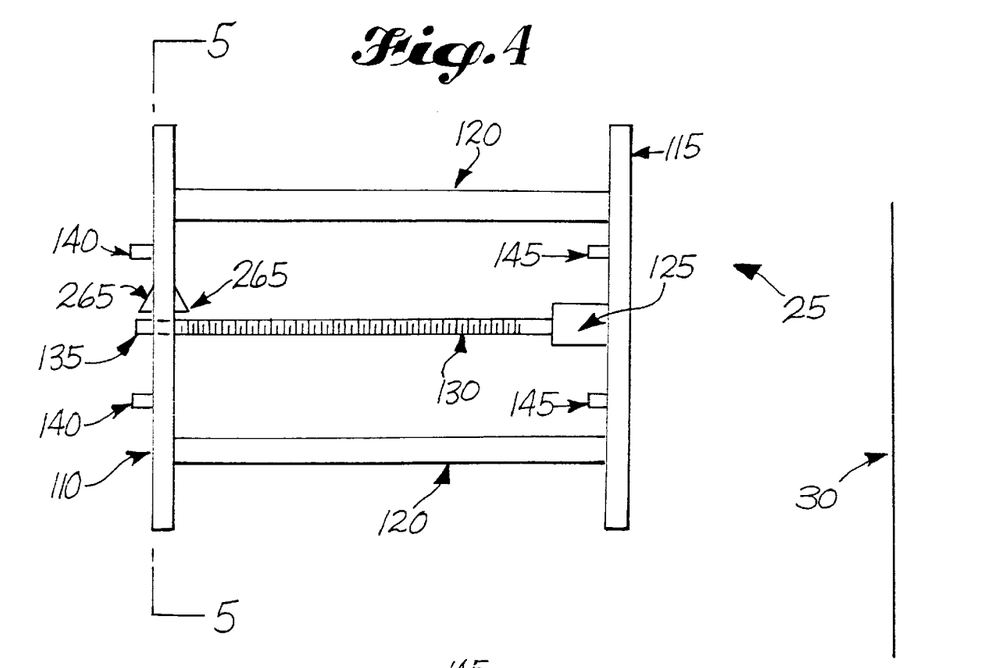
FIG. 4 is an isolated plan view of the underseat subassembly of the seating assembly of the present invention.
Figure 5:
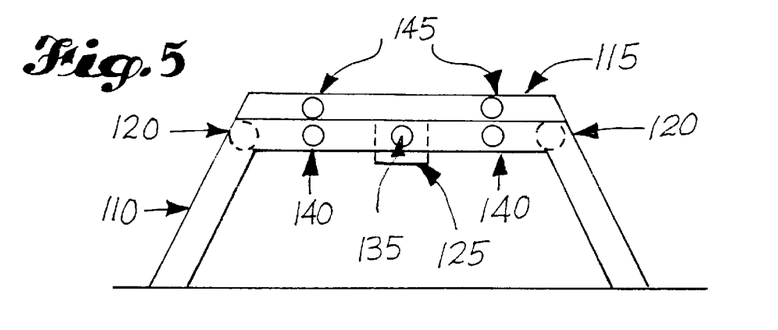
FIG. 5 is a side view of the underseat subassembly, taken along lines 5—5 in FIG. 4.

As best shown in FIGS. 4 and 5, the underseat subassembly comprises an inboard and an outboard frame 110, 115. Each frame comprises conventional seat legs attached to a horizontal frame member. The seat legs are each conventionally affixed to mounting tracks 20 disposed in the floor of the airplane. The inboard horizontal frame member is typically connected to the outboard horizontal frame by two transverse coupling tubes 120 as is current practice.

A first electric, pneumatic or hydraulic motor 125 is affixed to the outboard horizontal frame member and, in use, rotates a first drive screw 130 which extends from the outboard frame to the inboard frame. The distal end 135 of the first drive screw is supported in a bearing connected to the inboard horizontal frame member and is finished in a hexagonal shape to provide for the attachment of a hand crank or wrench in the event of power or motor failure. A first pair of locking pins 140 are attached to or formed on the horizontal member of the inboard frame 110 and extend outwardly from the underseat subassembly. A second pair of locking pins 145 are attached to or formed on the horizontal member of the outboard frame 115 and extend inwardly towards the inboard frame. As will better understood hereinafter, the first pair of pins and the second pair of pins are parallel to the transverse coupling tubes and lock the passenger seat assembly of the present invention either in a daytime or a nighttime position. As can be seen in FIG. 5 and will be better understood hereinafter the second pair of locking pins 145 are located in a horizontal plane above that of the transverse connecting tubes 120 to allow a flange containing receptacles which receive this second pair of locking pins to swing through a horizontal plane over the transverse connecting tubes and into alignment with the second pair of locking pins.

Figure 6:
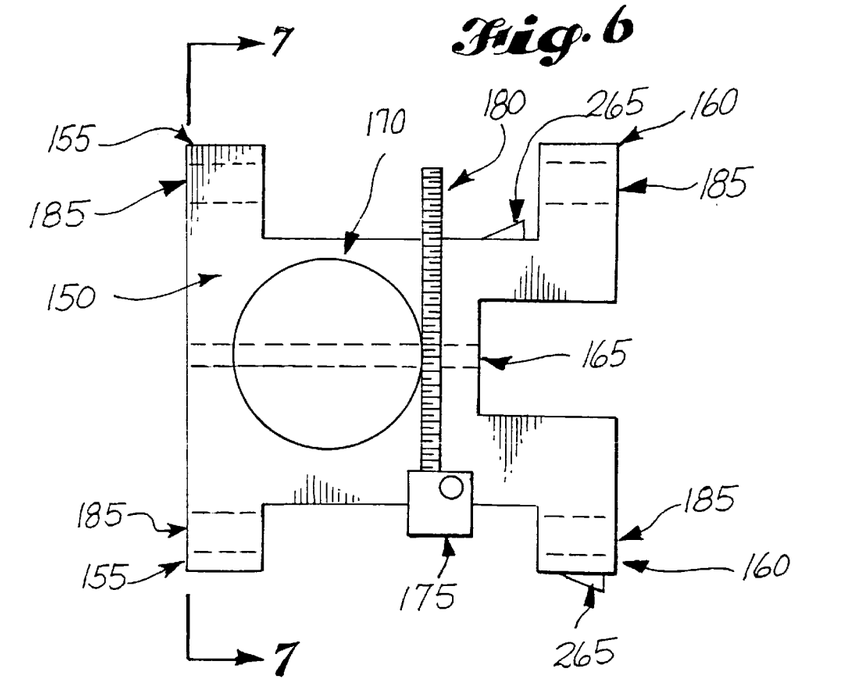
FIG. 6 is an isolated plan view of the sliding carrousel subassembly of the present seating assembly.
Figure 7:
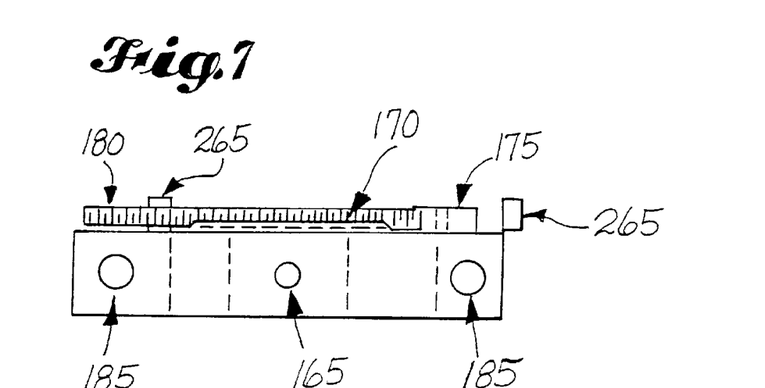
FIG. 7 is a side view of the sliding carrousel subassembly, taken along lines 7—7 in FIG. 6.

The sliding carrousel subassembly is shown in FIGS. 6 and 7 and, as will be better understood, is slidably mounted on the transverse tubes, and provides support for the upper seat base subassembly. The carrousel subassembly is composed of a first flat central plate 150 formed with two inboard arms 155, two outboard arms 160, a threaded hole 165 formed in the first central plate at the juncture of the outboard arms. A lower portion of a conventional "lazy susan" type bearing 170 is fastened to the upper surface of the first flat central plate for supporting the upper seat base subassembly and permitting it to rotate. A second electric, pneumatic or hydraulic motor 175, pivotably mounted on the upper surface of the first flat central plate drives a second drive screw 180. Each of the outboard arms 160 is provided with a smooth cylindrical bore 185 as is each of the inboard arms 155. The cylindrical bores in the outboard and inboard arms are aligned and sized to permit the free passage of one of the transverse tubes 120. In use, the transverse tubes freely pass through the aligned bearings 185 in the inboard and the outboard arms, whereby the carrousel subassembly may easily slide along the transverse tubes between the outboard and the inboard frames. As is perhaps better seen in FIGS. 10–12, the first drive screw 130 may be threadably coupled to the threaded hole 165 formed in the first central plate, whereby in use, when the first motor 125 rotates the first drive screw in a predetermined clockwise or counter-clockwise direction, the carrousel subassembly slides or translates along the transverse tubes away from or towards the side wall 30 of the airplane.

Figure 10:
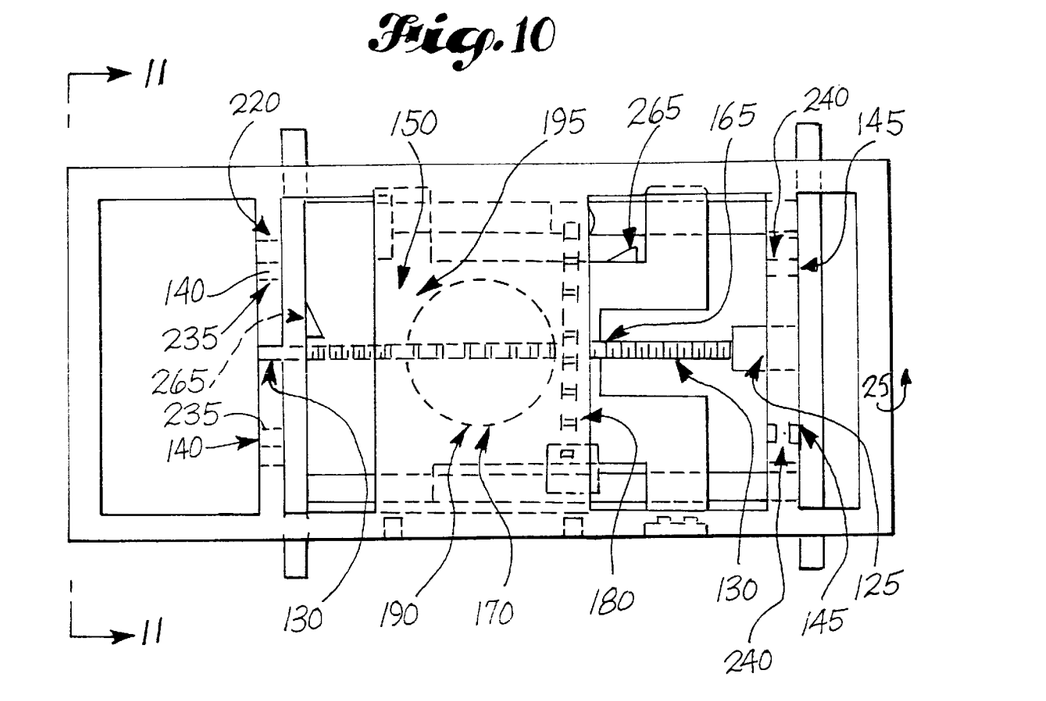
FIG. 10 is a plan view of the seat base subassembly of the present invention in the daytime position.
Figure 11:
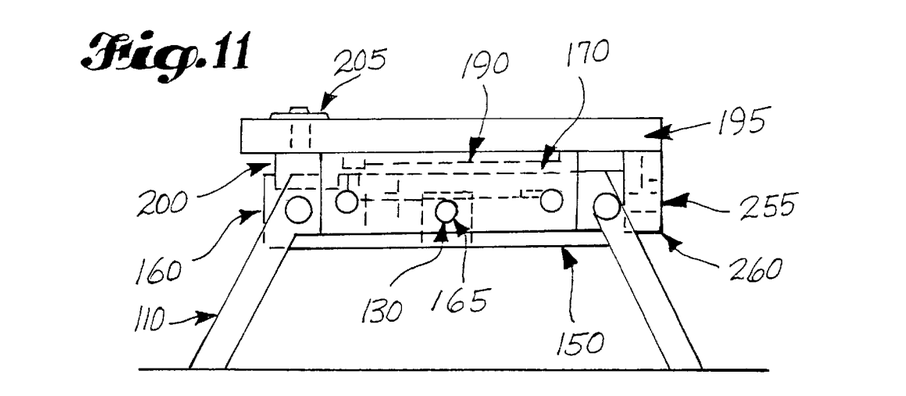
FIG. 11 is a side view of the seat base subassembly, taken along lines 11—11 in FIG. 10.
Figure 12:
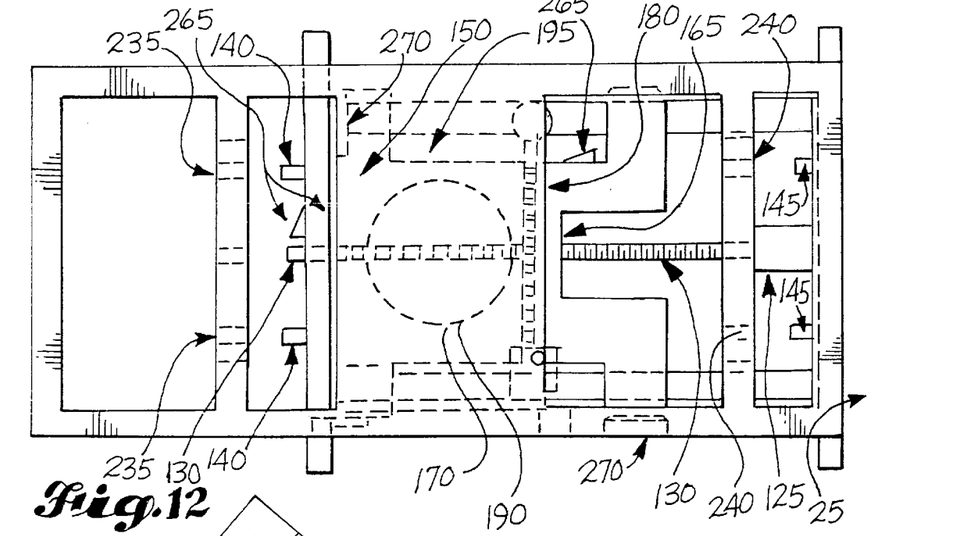
FIG. 12 is a plan view of the present seat base assembly in a first intermediate stage as the seat assembly translates from a daytime position towards a nighttime position.
Figure 13:
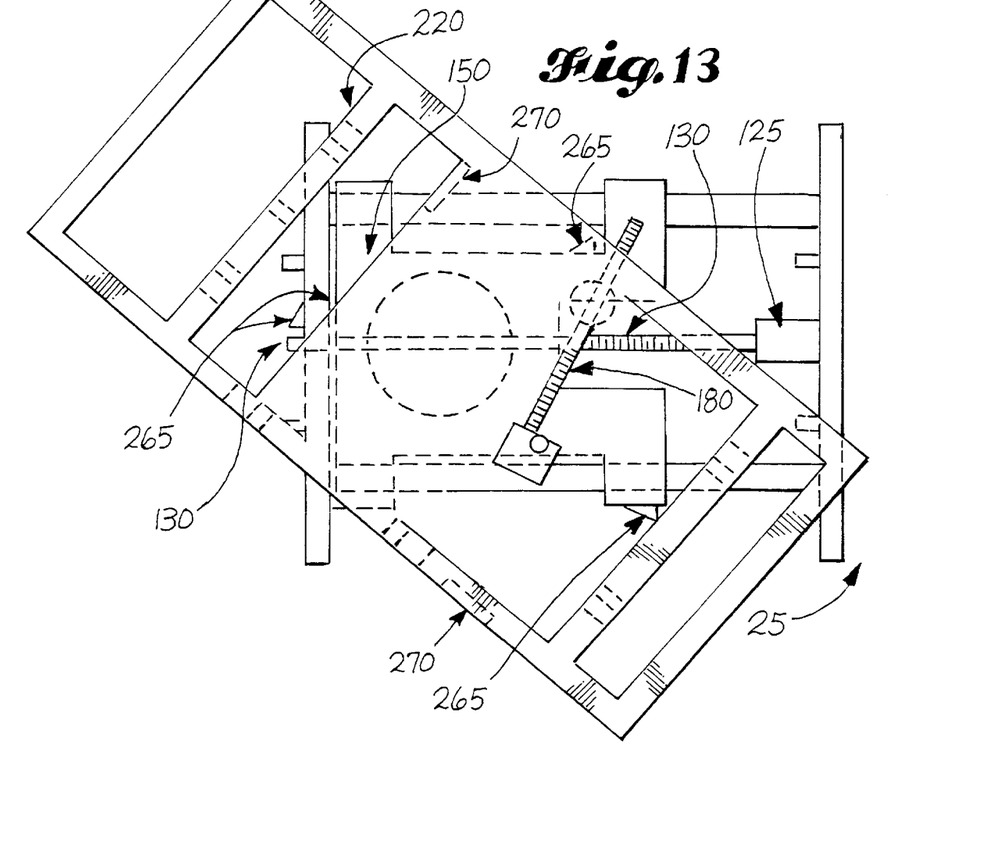
FIG. 13 is a plan view of the instant seat base assembly in a second intermediate stage wherein the assembly pivots toward the nighttime position.

As may be better seen in FIGS. 10–12, the lower portion of the lazy susan bearing 170 fastened to the first flat central plate of the carrousel subassembly is coupled to the upper portion of the lazy susan bearing 190 fastened to a second flat central plate 195 comprising part of the upper seat base subassembly. In use, the upper and lower portion of the lazy susan bearing pivotably supports the upper seat base subassembly and is designed to allow the upper seat base subassembly to rotate about a vertical axis while sustaining downward loads imposed on the seating assembly by, e.g. passengers.

Figure 8:
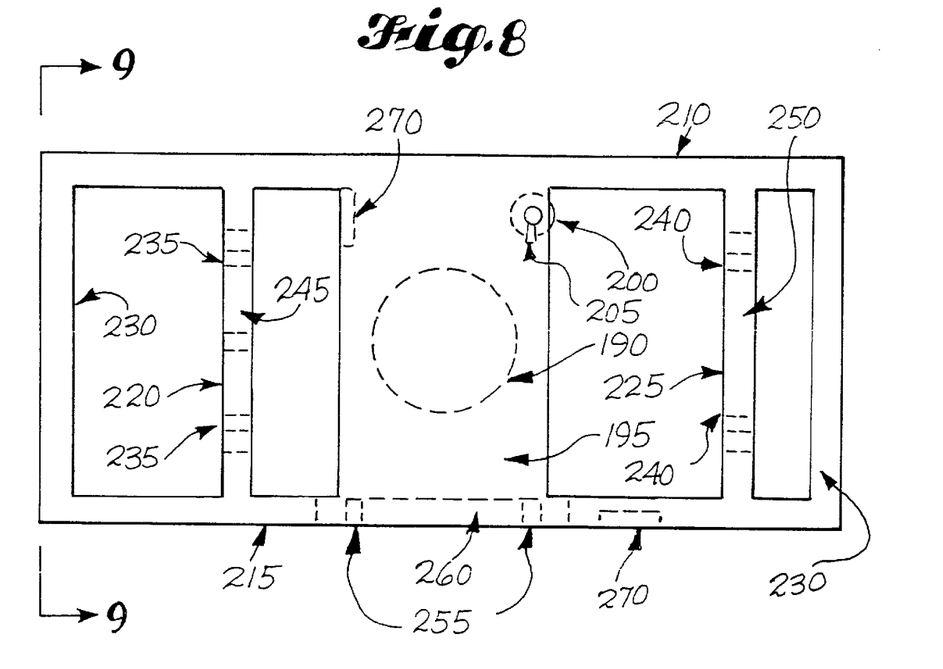
FIG. 8 is an isolated plan view of the upper seat base subassembly of the present invention.
Figure 9:
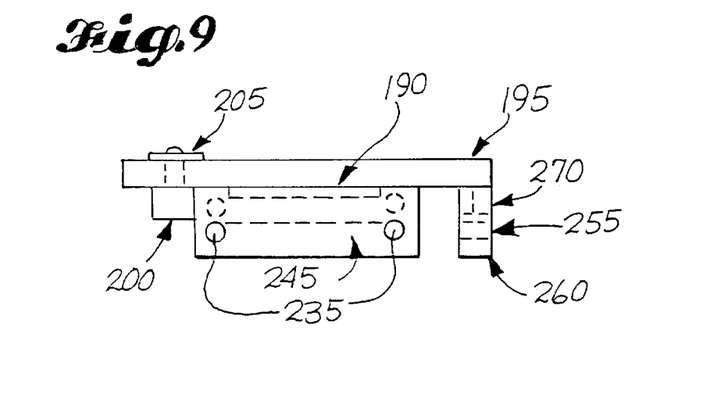
FIG. 9 is a side view of the upper seat base subassembly, taken along lines 9—9 in FIG. 8.

More particularly, as shown in FIGS. 8 and 9, the upper seat base subassembly 100 comprises the upper portion of the lazy susan bearing 190, which is mounted on the undersurface of a second flat central plate 195, and a pivotable cylindrical block 200. The cylindrical block is provided with a threaded hole, whose axis is parallel to the plane of the second flat central plate, and is pivotably attached through the second central plate from the underside and retained by a spring clip 205 on the upper surface of the second flat central plate. In use, the cylindrical block threadingly engages the second drive screw 180.

Figure 3:
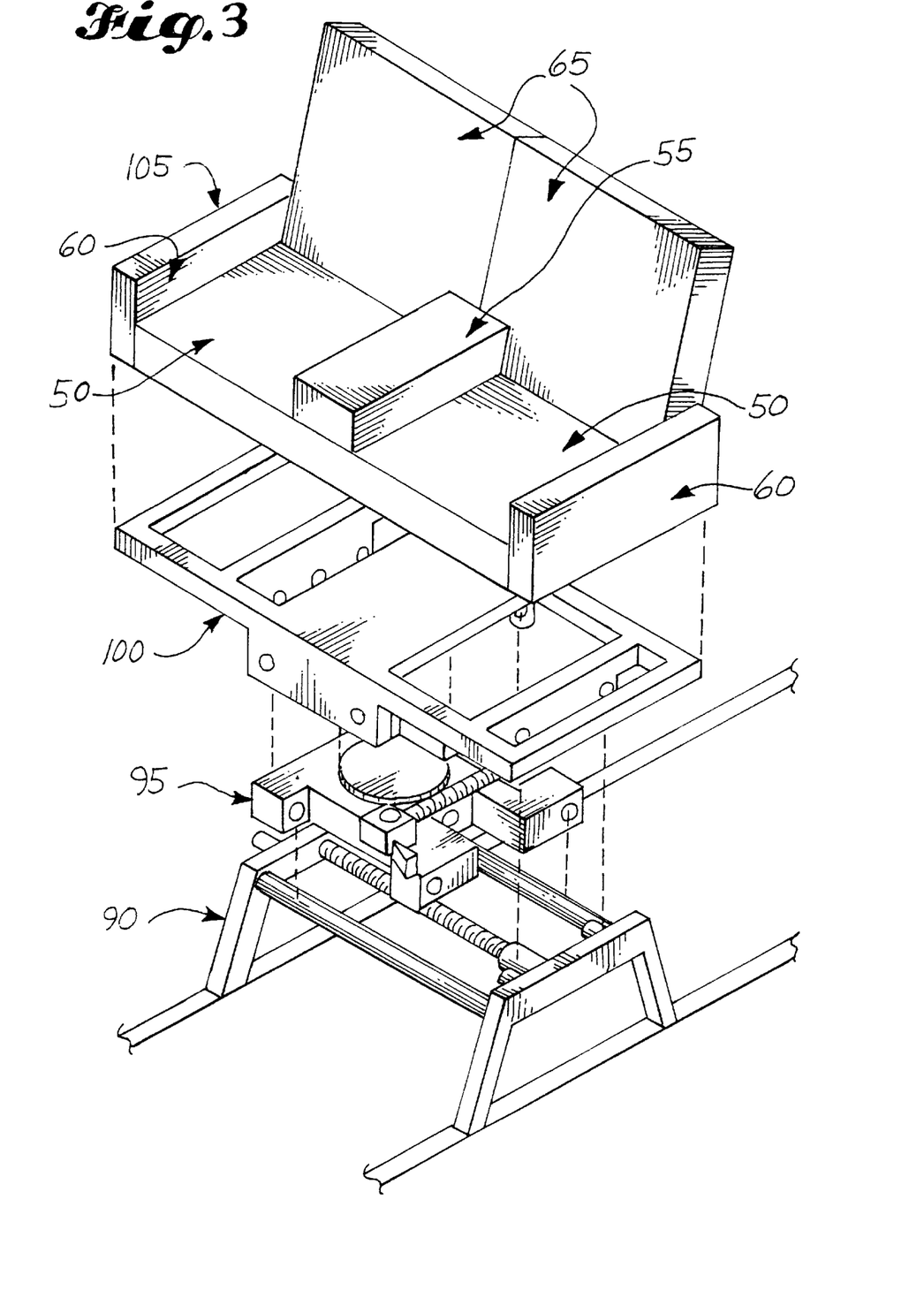
FIG. 3 is an exploded isometric view of the fully reclinable, pivotable, airplane passenger sleeper seat assembly of the present invention.

As shown in FIG. 8, the seat base frame which completes the upper seat base assembly comprises a first and second longitudinal tube 210, 215, a first and a second interior transverse tube 220, 225 attached to intermediate points on the longitudinal tubes, and two exterior transverse tubes 230 attached to the distal ends of the longitudinal tubes. As will be better understood hereinafter, the first and second interior transverse tubes 220, 225 are positioned as near as practical to the vertical planes described by the aircraft seat tracks in the daytime position so as to provide a direct downward load path from the upper seat subassembly to the aircraft seat tracks. The longitudinal tubes, interior transverse tubes and exterior transverse tubes may be of any appropriate cross-section. The seat base frame supports the upper seat subassembly which as shown in FIGS. 1 & 3, comprises conventional seat cushions 50, armrests 55 & 60, back rests 65, extendible leg rests 70 (not shown for clarity in FIG. 3), life jacket stowage (not shown), entertainment equipment (not shown) and associated support structures (also not shown).

As shown in FIGS. 8 and 9, the first and the second interior transverse tubes are provided with a first and a second pair of daytime receptacles 235, 240 formed in a first and a second flange 245, 250, respectively. The first and the second flanges downwardly depend from the first and the second interior transverse tubes, respectively, whereby in use, the first and the second pair of daytime receptacles may receive and engage the first and the second pair of locking pins, respectively. A pair of nighttime receptacles 255 are formed in a third flange 260 which is attached to and depends downwardly from the second longitudinal tube 215. In use, the first pair of locking pins 140 may be received within and engage the nighttime receptacles.

As shown in FIGS. 10 and 11, to provide a crashworthy method of supporting the upper seat assembly in the daytime position, it is envisioned that the first and the second pair of locking pins 140, 145 engage the first and second pair of daytime receptacles 235, 240 bored in the upper seat base subassembly 100. As will be better understood hereinafter, the final transverse motion of the upper seat base subassembly (toward the sidewall) in the transition to the daytime position from a nighttime position inserts these locking pins into the receptacles in the upper seat base subassembly. The engagement of the locking pins and receptacles is preferably designed to carry the 9 G or 16 G loads required by regulatory authorities for crashworthiness.

In the nighttime position (FIG. 15), in combination with the downward-load-bearing capacity of the carrousel subassembly 95, the first pair of locking pins 140 mounted on the underseat subassembly engage the pair of nighttime receptacles 255. As will be seen, the first pair of locking pins are inserted into the nighttime receptacles by a final lateral motion (toward the side wall) as the passenger seat 15 is converted to the nighttime position.

As seen in FIGS. 10, 12, 13, 14 and 15 in sequence, in use, the upper seat base subassembly is unlocked from its daytime position by the lateral translation away from the side wall of the airplane, pivoted to a position parallel to the adjacent aisle, and locked in the nighttime position by a lateral translation toward the side wall. Once in the nighttime position the back rest 65 can be reclined to a full down position and the leg rests 70 extended into the unused space of the aisle. This process has also been described in connection with FIGS. 1 and 2.

Figure 14:
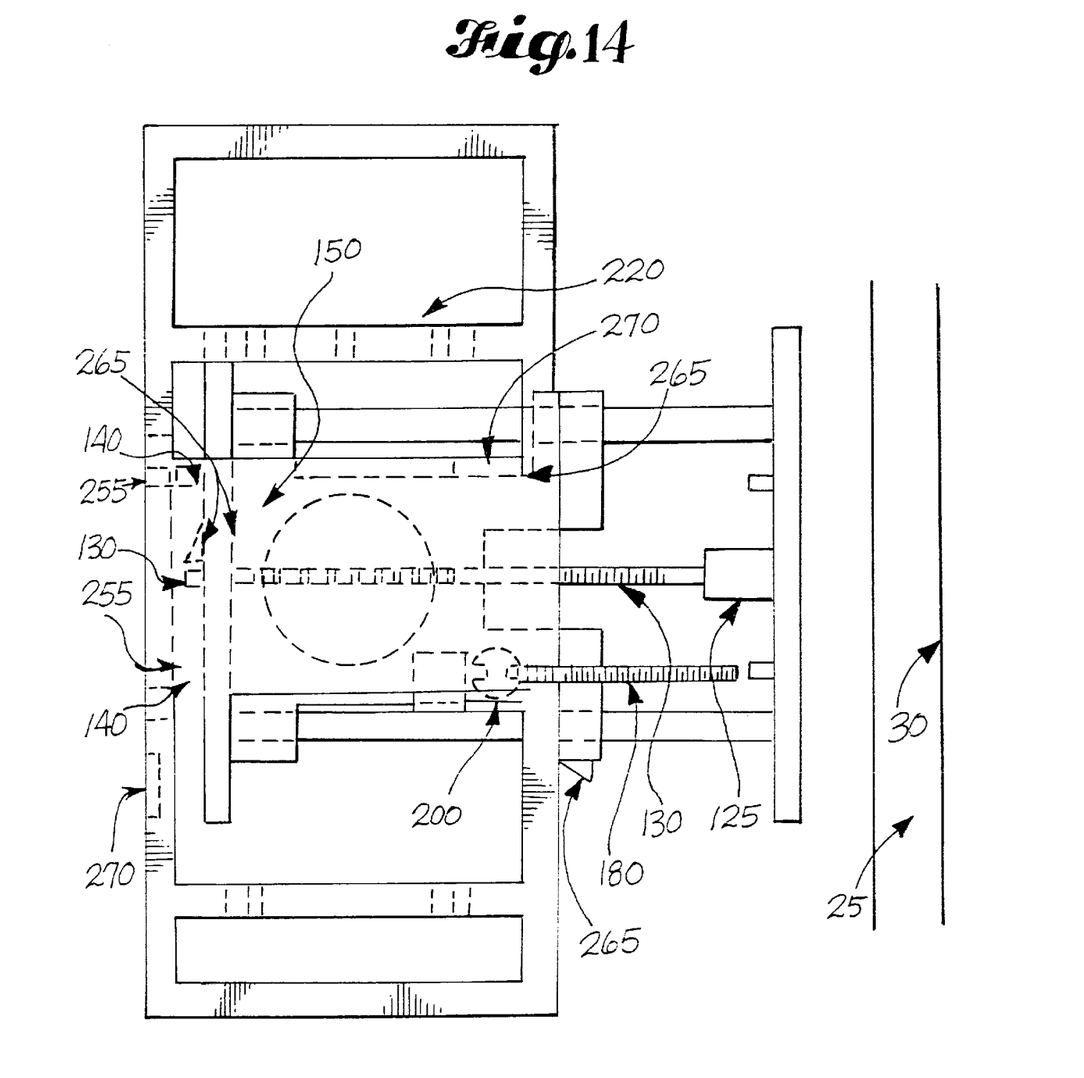
FIG. 14 is a plan view of the seat base assembly of the present invention wherein the assembly is in a third intermediate stage just prior to being locked in the nighttime position.
Figure 15:
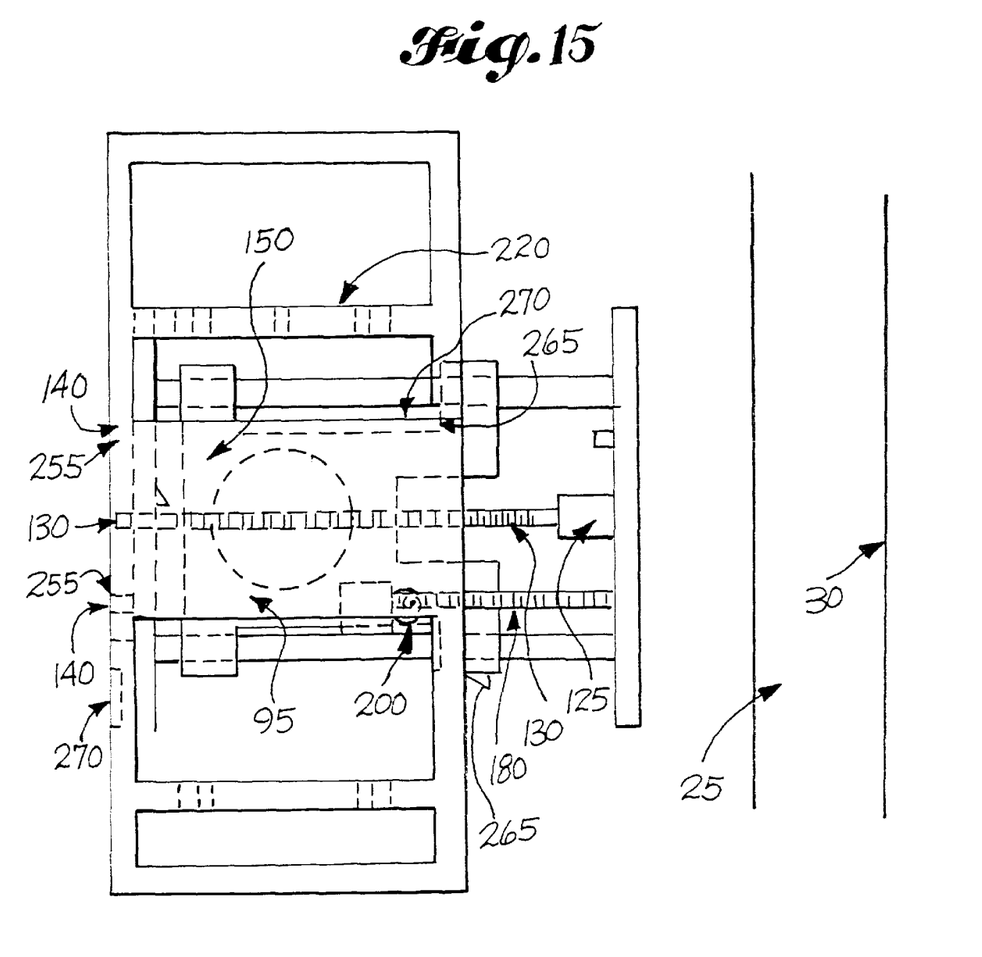
FIG. 15 is a plan view of the seat base assembly showing the assembly in a final stage or locked in the nighttime position.

More particularly and with reference to FIGS. 10–15, in daytime mode use, the first and second pairs of locking pins 140, 145 are secured within the first and second pairs of receptacles 235, 240, respectively. When all meal service is complete and passengers wish to retire, a crew member can provide power to the seat assembly 15 to facilitate transition from a daytime position (FIG. 10) to a nighttime position (FIG. 15). A lateral (FIG. 12) and turning or pivoting (FIG. 13) motion of the upper seat base subassembly is required to move the seat assembly from the daytime position to the nighttime position (and vice versa). This can be accomplished manually. However, to be consistent with the ambiance desired in premium travel, a powered system such as an electrical pneumatic or hydraulic system, is foreseen.

As described above, such a powered system has been provided in the present invention using the first and the second motorized drive screws. The first drive screw 130 is mounted parallel to the transverse tubes in the underseat subassembly so as to slide the carrousel subassembly along the transverse tubes. The second drive screw 180 connects the carrousel subassembly to the seat base subassembly in such a way as to turn the seat base subassembly substantially 90° relative to the carrousel subassembly, although lesser angles are possible.

The first and the second drive screw motors can best be controlled by a set of limit switches 265 arranged so as contact the first interior transverse tube 220 of the seat base frame, the first flat central plate 150 or feeler flanges 270 depending downwardly from the seat base frame so as to sequence motions in the following way. Thus, in use, when the system is activated by a crew member, the first drive screw 130 operates to move or translate the carrousel subassembly 95 laterally along the transverse tubes from the position shown in FIG. 10 sufficiently to withdraw both pairs of locking pins 140, 145 to a first intermediate stage, the position shown in FIG. 12. Second, the second drive screw 180 operates to rotate the upper seat subassembly 105 (not shown) through the second intermediate stage shown in FIG. 13. Once the upper seat subassembly is in a third intermediate stage shown in FIG. 14, just prior to locking the upper seat assembly 105 in place, the first drive screw motor is activated to reverse the transverse motion of the carrousel subassembly 95 and insert the first pair of locking pins 140 into the nighttime receptacles 255 for the nighttime position illustrated in FIG. 15.

To return the seat to the daytime position in the event of a system failure, a hand crank or wrench (not shown) engaged with the hexagonal inboard end of the first drive screw 130 may be employed to turn the first drive screw 130 and translate the upper seat base 100 into the position shown in FIG. 14. After the first drive screw is turned sufficiently using the hand crank or wrench to disengage the first pair of locking pins 140 from the nighttime receptacles 255, the spring clip 205 securing the pivoting cylindrical block 200 to the seat base subassembly is pulled out of the upper end of the cylindrical block allowing the cylindrical block to fall out of engagement with the seat base subassembly thereby freeing the upper seat assembly 105 to be pivoted manually to the position indicated in FIG. 12. Finally, the transverse motion (including the insertion of both pairs of locking pins 140, 145 into the first 235 and second 240 pairs of receptacles) may be effected with the hand cranked first drive screw 130.

Because the effort required to rotate the upper seat subassembly may be considerably less than that required to displace the upper seat subassembly 105 in the transverse direction, elimination of the second motor 175, the second drive screw 180 and other components required to powerably rotate the upper seat subassembly may be considered a desirable simplification of the previously described implementation of the present invention. It is also foreseen that under some circumstances the elimination of both drive motors and drive screws and related components may be considered a desirable simplification of the previously described implementation of the present invention.

The preferred method of taking advantage of aisle and under-sidewall space for providing sleeping accommodations is to manufacture and install two-seat units of similar dimensions to those currently in use (53 inch to 57 inch total width and 70 inch total length when fully reclined.) These seating units, from the forward-facing boarding and meal service "daytime" position 35 shown in FIG. 2, pivot around a vertical axis so as to face the aisle and translate toward the aisle sufficiently to allow the seat backs to recline to the horizontal position 75.

Figure 16:
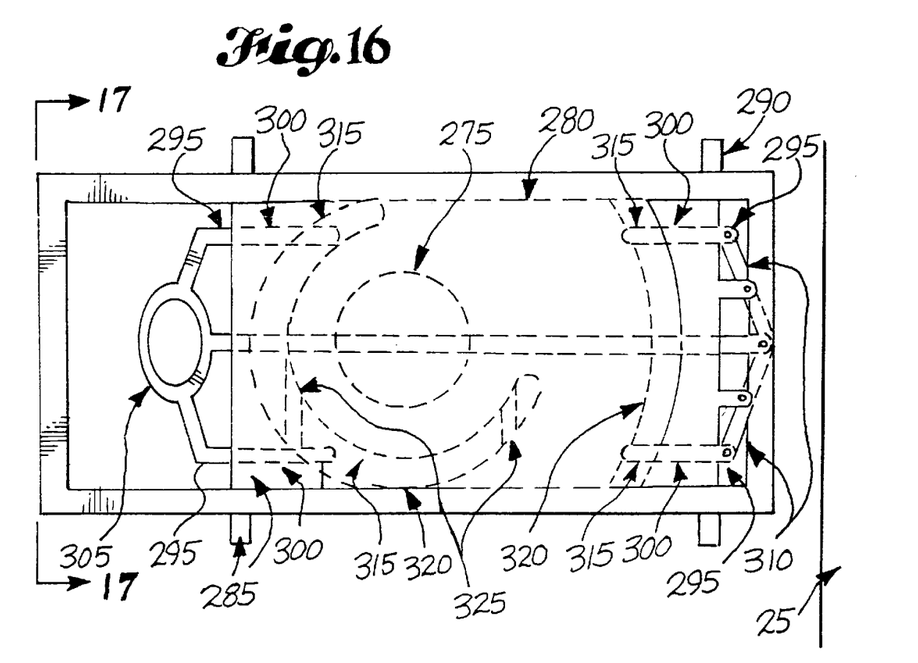
FIG. 16 is a plan view of the simplified seat base assembly of present invention in the daytime position.
Figure 17:
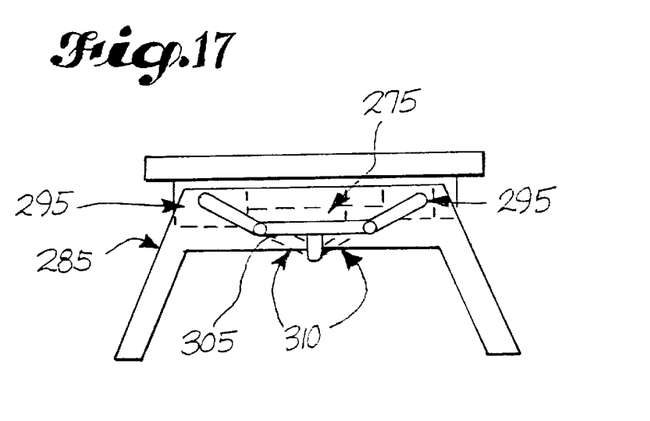
FIG. 17 is a side view of the simplified seat base assembly, taken along lines 17—17 in FIG. 16.
Figure 18:
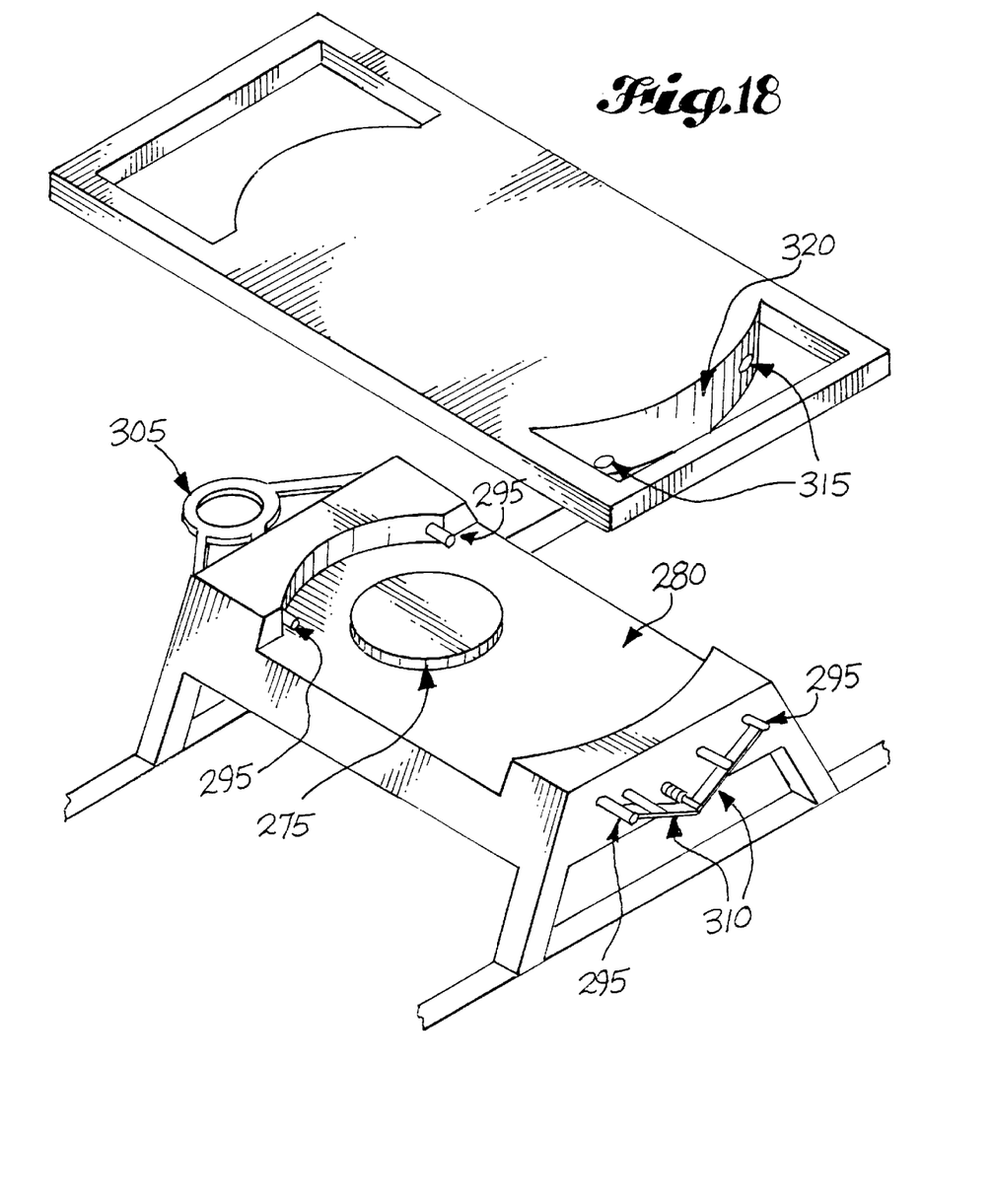
FIG. 18 is an exploded isometric view of the simplified seat base assembly of the present invention.

The geometry of some installations such as the upper deck of the 747 make it possible to accomplish the reorientation of the present seat assembly without the need to translate the upper seat subassembly 105 away from the sidewall. Such a geometry makes it possible to employ the simplified seating assembly of the present invention shown in FIGS. 16–18. In this simplified application, the lower portion of a lazy susan bearing 275 is fastened to a lower plate 280 which connects an inboard frame 285 an outboard frame 290 of the underseat subassembly. Locking pins 295 are provided which move freely in smooth bores 300 in the inboard and outboard frames of the underseat subassembly. A release handle 305 is provided which directly, in the case of the inboard locking pins, and by means of levers 310, in the case of the outboard locking pins, pulls the locking pins out of engagement with receptacles 315 bored in semi-circular flanges 320 which downwardly depend from a seat base frame. The release handle can be designed so that its function is unobvious to the untrained or it can be secured with a lock adequate to prevent unauthorized pivoting of the seat. Conversion of the seat from the daytime position to the nighttime position involves pulling the release handle, turning the upper seat to the desired position and pushing the release handle to engage locking pins in the nighttime receptacles 325. If a locking mechanism is provided, conversion is preceded by unlocking the release handle and followed by relocking the release handle.

The 13 inch incursion into the standard "daytime" aisle that results from pivoting and reclining the seats leaves a 21 inch aisle in the 747 main deck and a 16 inch aisle in the 777 for passenger movement during sleeping periods. In the case of the 747 upper deck a 5.5 inch incursion into the aisle (as typically configured with 54 inch total seat width units) coupled with a 10.5 inch overhang of the stow bins provides space for the 70 inch seat. These seats could be installed at (e.g.) 60 inch pitch making it possible to install four rows of seats rather than three rows of conventional seats at 80 inch pitch in a 240 inch length of cabin. Since all seats face the aisle in the nighttime position, the difficulty of window seat passengers accessing the aisle is eliminated. In addition to this issue of aisle access, seats providing a 70 inch length in this transverse position are acceptable in preference to seats providing 80 inch length in the lateral position because foot overhang from the transverse orientation extends into the aisle while foot overhang in the lateral orientation extends into the head of another passenger.

The area between the two aisles in twin-aisle configurations can either be configured with galley and lavatory installations or sleeper seats installed with sufficient pitch to enable them to be fully reclined.

The 747 upper deck geometry has been described although the instant seat is workable in any vehicle with comparable dimensional space. As noted earlier, in main deck applications, because a greater lateral translation away from the sidewall is required, seat rotation will be accomplished in an intermediate position in the lateral translation and nighttime locking pins (oriented in the opposite direction of the daytime locking pins) engaged by completing the lateral translation.

To provide for easy access to seats in the nighttime position the foregoing description has consistently described pivoting the passenger seats toward the aisle. Under certain circumstances, as where an emergency exit path or other configuration detail would provide adequate access, it may be acceptable or even preferred to pivot the passenger seats away from the aisle toward the side wall. Such a use is foreseen by the present invention and the principles, structures and methods described herein are equally suitable for orienting passengers away from an aisle toward a sidewall.

The foregoing description of the present invention has generally described the use of double seats rotating toward a nighttime position that is substantially perpendicular to the aisle. The principles, structures and methods of the present invention can also be employed with other seating units rotated to lesser angles relative to the aisle. As an example, the advantages of the present invention will be gained by a first single seat unit rotated only sufficiently to allow the leg rests of said first seat or the legs of a passenger seated in said first seat to be extended into the aisle alongside a second seat positioned forward of said first seat. Such a displacement resembles the fixed echelon position shown in the aforementioned British patent to Dryburgh, et al. However the present invention offers the improvements of having additional aisle space available to aid passenger mobility during boarding, deplaning and meal service. These advantages are not foreseen by Dryburgh, et al.

It is often considered desirable to tilt or "rake" seat bottom cushions such that they are higher at the front or leading edge than at the back or rear edge. However seat bottom rake may be considered undesirable when a seat is fully reclined. Persons of ordinary skill in the art of designing reclinable seats are familiar with design approaches that eliminate rake when seats are reclined. The pivoting aspect of the present invention, however, offers a simple and therefore preferred method of eliminating rake in the transition from the daytime to the nighttime orientation. The degree of front to back seat bottom tilt or rake in the daytime will be referred to hereinafter as the rake angle. If the lazy susan bearing of the present invention is oriented such that both the forward and the outboard edge of the bearing are raised by one half of the desired rake angle, i.e., the lazy susan bearing is oriented in a plane which is horizontal on an axis running 45 degrees inboard of forward to 45 degrees outboard of aft, and inclined by an angle equal to one half the desired rake angle times the square root of two on an axis running from 45 degrees inboard of aft to 45 degrees outboard of forward, and the upper seat base and upper seat subassemblies are designed and installed such that the seat bottom has the desired degree of rake in the forward-facing daytime position, the seat bottom will have no rake when pivoted to the inboard-facing nighttime position.

While the principles of this invention have been described in connection with specific embodiments, it should be understood clearly that these descriptions are made only by way of example and are not intended to limit the scope of the invention.

What is claimed and desired to be secured by Letters Patent of the United States is:

1. A double passenger sleeper seat assembly for use in a vehicle having a plurality of seats separated by at least one aisle, each of said seats having a pivotable seat back and an extendible leg rest, said assembly comprising:

(a) a first base subassembly affixed to said vehicle along said aisle;
    (b) a second subassembly for supporting each of said seat backs and each of said leg rests, said second subassembly being rotatably supported on said first subassembly;
    (c) means for translating said second subassembly with respect to said first subassembly from a first position to a second position closer to said aisle;
    (d) means for rotating said second subassembly with respect to said first subassembly whereby each of said seat backs and said leg rests may be disposed in a substantially horizontal position and each of said leg rests may be extended into said aisle.

2. The sleeper seat assembly of claim 1, further comprising means for powerably translating said second assembly with respect to said first subassembly.

3. The sleeper seat assembly of claim 1, further comprising means for powerably rotating said second assembly with respect to said first subassembly.

4. The sleeper seat assembly of claim 1, further comprising:

(a) means for locking said second subassembly in said first position, and
    (b) means for locking said second subassembly in said second position.

5. The sleeper seat assembly of claim 1, wherein said second position is perpendicular to said aisle.

6. A double passenger sleeper seat assembly for use in a vehicle having a plurality of seats separated by at least one aisle, each of said seats having a pivotable seat back and an extendible leg rest, said assembly comprising:

(a) a first base subassembly affixed to said vehicle along said aisle;
    (b) a second subassembly for supporting each of said seat backs and each of said leg rests, said second subassembly being rotatably supported on said first subassembly from a first position to a second position, said second subassembly having a first receptacle and a second receptacle, said first receptacle being aligned substantially perpendicular to said second receptacle;
    (c) means for rotating said second subassembly with respect to said first subassembly whereby said second subassembly may be projected into said aisle;
    (d) at least one locking pin slidably supported in said first subassembly, said locking pin being insertable within said first receptacle when said second subassembly is in said first position and being insertable within said second receptacle when said second subassembly is in said second position, and
    (e) a release handle connected to said locking pin for inserting said locking pin into said first receptacle and said second receptacle.

7. The sleeper seat assembly of claim 6, further comprising means for powerably rotating said second assembly with respect to said first subassembly.

8. The sleeper seat assembly of claim 6, wherein said second position is perpendicular to said aisle, whereby each of said seat backs may be pivoted and each of said leg rests may be extended into a horizontal position within said aisle.

9. A process for providing a fully reclinable passenger seat arrangement in an airplane by maximizing the use of space within said vehicle, said arrangement including a plurality of double seat units separated by an aisle disposed within said airplane, each of said seats having a pivotable seat back and an extendible leg rest, said process comprising:

(a) affixing a first base subassembly to said airplane along said aisle;
    (b) rotatably supporting a second subassembly on said first base subassembly, said second subassembly supporting said seat back and said leg rest;
    (c) translating said second subassembly with respect to said first base subassembly from a first position to a second position closer to said aisle;
    (d) rotating said second subassembly with respect to said first base subassembly;
    (e) disposing at least one of said seat backs and at least one of said leg rest in a substantially horizontal position, and
    (f) extending at least one leg rest into said aisle.

10. A process for providing a fully reclinable passenger seat arrangement in an airplane, said arrangement including a plurality of double seat units separated by at least one aisle disposed within said airplane, said process comprising:

(a) affixing a first base subassembly to said airplane along said aisle;

(b) rotatably supporting a second subassembly on said first base subassembly from a first to a second position;

(c) providing said second subassembly with a first receptacle and a second receptacle;

(d) aligning said first receptacle substantially perpendicular to said second receptacle;

(e) slidably supporting at least one locking pin in said first subassembly;

(f) providing a release handle;

(g) connecting said release handle to said locking pin;

(h) inserting said locking pin into said first receptacle when said second subassembly is in said first position using said release handle;

(i) inserting said locking pin into said second receptacle when said second subassembly is in said second position using said release handle, and (j) rotating said second subassembly with respect to said first base subassembly and projecting said second subassembly into said aisle.

11. A passenger sleeper seat assembly for use in an airplane having two or more longitudinal walls defining a space for passenger seating, and a plurality of seats disposed in said space separated by at least one aisle, said aisle having a substantially fore and aft longitudinal orientation in said airplane, each of said seats having a pivotable seat back and an extendible leg rest, said assembly comprising:

(a) a first base subassembly affixed to said vehicle along said aisle;

(b) a second subassembly for supporting said seat back and said leg rest, said second subassembly being rotatably supported on said first base subassembly;

(c) means for translating said second subassembly with respect to said first base subassembly from a first position near one of said longitudinal walls to a second position farther from said longitudinal wall, said translation displacing said second subassembly a distance sufficient to enable said leg rest to be extended and said seat back to be pivoted into a horizontal plane from a substantially transverse-facing position without interference from said longitudinal walls, and (d) means for rotating said second subassembly with respect to said first base subassembly whereby said second subassembly may be projected into said aisle.

12. The sleeper seat of claim 11, further comprising:

(a) a releasable locking subassembly for securing said second subassembly in said first position, said locking subassembly comprising projections made integral to said first base subassembly and mating receptacles made integral to said second subassembly, said projections and said receptacles being oriented parallel to the direction of translation so as to employ the initial translation from said first position to said second position to withdraw and disengage said projections from said receptacles and to employ the final translation from said second position to said first position to insert and engage said projections into said receptacles, and (b) a second releasable locking subassembly for securing said second subassembly in said second position.

13. The sleeper seat assembly of claim 12, wherein said translation means comprises a drive screw mounted on said first base subassembly, said drive screw being aligned parallel to the axis of translation of said second subassembly.

14. The sleeper seat assembly of claim 11, wherein upright seats face in a direction perpendicular to said aisle in said second position, whereby said seat back may be pivoted and said leg rest may be extended into a horizontal position.

15. A passenger sleeper seat assembly for use in a vehicle having two or more longitudinal walls, and a plurality of double seat units separated by at least one aisle, said aisle being disposed between said walls and having a substantially fore and aft longitudinal orientation in said vehicle, each of said seats having a pivotable seat back and an extendible leg rest, said assembly comprising:

(a) a first base subassembly affixed to said vehicle along said aisle;

(b) a second subassembly for supporting said seat back and said leg rest, said second subassembly being rotatably supported on said first base subassembly;

(c) means for rotating said second subassembly with respect to said first base subassembly from a first position facing towards said forward longitudinal orientation to a second position whereby said second subassembly may be projected into said aisle, and (d) a locking means comprising at least two locking pins slidably supported in a transverse direction in said first base subassembly, said locking pins being insertable within receptacles in said second subassembly when said second subassembly is in said first position, and a release handle connected to said locking pins for inserting said locking pins into said receptacles.

16. The sleeper seat assembly of claim 15, wherein said seats in said second position face in a direction perpendicular to said aisle, whereby said seat back may be pivoted and said leg rest may be extended into a horizontal position.

17. A process for providing a fully reclinable passenger seat arrangement in an airplane having two or more longitudinal walls, and including a plurality of seats separated by an aisle, said aisle having a substantially fore and aft longitudinal orientation in said airplane, said process comprising:

(a) affixing a first base subassembly to said airplane along said aisle in a limited space disposed along a longitudinal direction, said limited longitudinal space being less than that required to enable said seats to be fully reclined and extended into a horizontal plane;

(b) rotatably supporting a second subassembly on said first base subassembly, said second subassembly being capable of accommodating two persons and supporting two seat backs and two leg rests;

(c) translating said second subassembly with respect to said first base subassembly from a first position to a second position in a transverse direction toward said aisle, said translation moving said second subassembly a distance sufficient to enable said second assembly to be rotated with respect to said first base subassembly and said leg rests to be extended and said seat backs to be pivoted into a horizontal plane from a transverse-facing position without interference from said longitudinal walls, and (d) rotating said second subassembly with respect to said first base subassembly to an orientation in which said seat backs face in a direction substantially perpendicular to said aisle and projecting structures supported by said second subassembly into said aisle.

18. A process for providing a fully reclinable passenger seat arrangement in an airplane having two or more longitudinal walls, and including a plurality of seats separated by an aisle, said aisle having a substantially fore and aft longitudinal orientation in said airplane, said process comprising:

(a) affixing a first base subassembly to said airplane along said aisle in a limited space disposed in the longitudinal direction, said limited longitudinal space being less than that required to enable said seats to be fully reclined and extended into a horizontal plane;

(b) rotatably supporting a second subassembly on said first base subassembly, said second subassembly being capable of accommodating two persons and supporting two seat backs and two leg rests, and (c) rotating said second subassembly with respect to said first base subassembly to an orientation in which said seat backs face in a direction perpendicular to said aisle and projecting structures supported by said second subassembly into said aisle.

19. A process for providing a fully reclinable passenger seat arrangement in an airplane, said airplane having two or more longitudinal walls, and including a plurality of seats separated by an aisle, said aisle having a substantially fore and aft longitudinal orientation in said airplane, said process comprising:

(a) affixing a first base subassembly to said airplane along said aisle in a limited longitudinally extending space disposed proximate said aisle, said limited longitudinal space being less than that required to enable said seats to be fully reclined and extended into a horizontal arrangement;

(b) rotatably supporting a second subassembly on said first base subassembly, said second subassembly being capable of accommodating one person and supporting one seat back and one leg rest;

(c) translating said second subassembly with respect to said first base subassembly from a first position to a second position in a transverse direction toward said aisle, said translation moving said second subassembly a distance sufficient to enable said second assembly to be rotated with respect to said first base subassembly, said leg rest to be extended, and said seat back to be pivoted into a horizontal plane without interference from said longitudinal walls, and (d) rotating said second subassembly with respect to said first base subassembly and projecting structures supported by said second subassembly into said aisle.

20. A process for providing a fully reclinable passenger seat arrangement in an airplane having two or more longitudinal walls, and including a plurality of seats separated by an aisle, said aisle having a substantially fore and aft longitudinal orientation in said airplane, said process comprising:

(a) affixing a first base subassembly to said airplane along said aisle in a limited space disposed in a longitudinal direction, said limited longitudinal space being less than that required to enable said seats to be fully reclined and extended into a horizontal arrangement;

(b) rotatably supporting a second subassembly on said first base subassembly, said second subassembly designed to accommodate one person and supporting a seat back and a leg rest, and (c) rotating said second subassembly with respect to said first base subassembly and projecting structures supported by said second subassembly into said aisle.

21. A process for maximizing the number of reclinable passenger sleeper seats within a fixed space within said airplane, each of said sleeper seats being separated from another sleeper seat at a distance less than the length of said sleeper seat when fully extended, said sleeper seats being separated by an aisle disposed within said airplane, each of said sleeper seats having a pair of pivotable seat backs and a pair of extendible leg rests, said process comprising:

(a) affixing a plurality of first base subassemblies to said airplane along both sides of said aisle;

(b) rotatably supporting a second subassembly on each of said first base subassemblies, said second subassembly supporting at least one seat back and at least one leg rest;

(c) translating at least one of said second subassemblies with respect to at least one of said first subassemblies from a first position away from one of said side walls to a second position closer to said aisle;

(d) rotating said at least one second subassembly with respect to said at least one first base subassembly to position a sleeper seat substantially transverse to said aisle;

(e) disposing said at least one seat back and said at least one leg rest in a substantially horizontal position, and (f) extending said at least one leg rest into said aisle.

* * * * *